United States Patent Office 3,736,341
Patented May 29, 1973

3,736,341
ACRYLOXYACYL CHLORIDES
Martin J. Diamond, 6131 Hillegass Ave., Oakland, Calif. 94618, and Howard L. Needles, Davis, Calif. 95618
No Drawing. Original application Mar. 20, 1970, Ser. No. 21,499, now Patent No. 3,615,554. Divided and this application Nov. 12, 1971, Ser. No. 198,471
Int. Cl. C07c 69/54
U.S. Cl. 260—405
4 Claims

ABSTRACT OF THE DISCLOSURE

Acryloxyacyl chlorides of the structure—

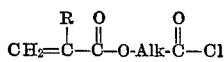

wherein R is H or CH₃ and Alk is a bivalent hydrocarbon radical containing 1 to 21 carbon atoms. These compounds may be homopolymerized or copolymerized with a different polymerizable monomer (e.g., a lower alkyl acrylate or methacrylate). The polymers are useful for application to fibrous materials, for example, to wool to make it shrink resistant.

---

This is a division of application Ser. No. 21,499, filed Mar. 20, 1970, now U.S. Pat. 3,615,554.

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of new organic compounds, namely, acryloxyacyl chlorides, in both monomeric and polymeric form. The objects of the invention also include methods for synthesizing these compounds, procedures for treating fibrous materials with the compounds, and the treated materials as new articles of manufacture. Further objects of the invention will be evident from the following description wherein parts and percentages are by weight unless otherwise specified.

THE MONOMERS

The novel acryloxyacyl chlorides of the invention have the structure—

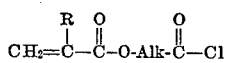

wherein R is H or CH₃, and Alk is a bivalent aliphatic hydrocarbon group, saturated or containing ethylenic unsaturation, straight chain or branched, which contains 1 to 21, preferably 9 to 21, carbon atoms.

Examples of individual compounds encompassed by the invention are provided below by way of illustration and not limitation:

CH₂=CH—CO—O—CH₂—CH₂—COCl

CH₂=CH—CO—O—(CH₂)₃—COCl

CH₂=C(CH₃)—CO—O—(CH₂)₅—COCl

CO₂=CH—CO—O—(CH₂)₇—COCl

CH₂=CH—CO—O—(CH₂)₁₁—COCl

CH₂=C(CH₃)—CO—O—(CH₂)₁₅—COCl

CH₂=CH—CO—O—(CH₂)₁₇—COCl

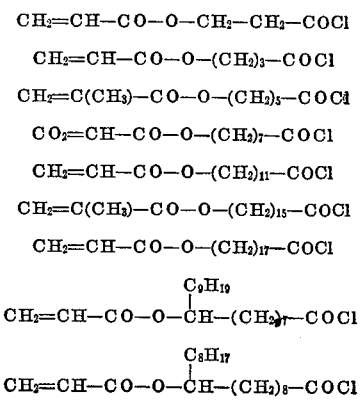

$$CH_2=CH-CO-O-\underset{\underset{C_7H_{15}}{|}}{CH}-(CH_2)_9-COCl$$

$$CH_2=C(CH_3)-CO-O-\underset{\underset{C_6H_{13}}{|}}{CH}-(CH_2)_{10}-COCl$$

$$CH_2=CH-CO-O-\underset{\underset{C_8H_{17}}{|}}{CH}-(CH_2)_{12}-COCl$$

$$CH_2=CH-CO-O-\underset{\underset{C_8H_{13}}{|}}{CH}-CH_2-CH=CH-(CH_2)_7-COCl$$

$$CH_2=CH-CO-O-\underset{\underset{C_6H_{13}}{|}}{CH}-CH_2-CH=CH-(CH_2)_9-COCl$$

PREPARATION OF THE NEW COMPOUNDS

In the synthesis of the compounds of the invention a hydroxyaliphatic acid is reacted with acryloyl (or methacryloyl) chloride to produce the corresponding acryloxyaliphatic (or methacryloxyaliphatic) acid. To prevent polymerization, the reaction is carried out in the presence of a small proportion of a polymerization inhibitor such as copper resinate, a commercial product which is an oil-soluble copper salt made by heating copper sulphate with rosin oil. In a second step, the acryloxyaliphatic acid is reacted with oxalyl chloride or thionyl chloride to produce the acryloxyacyl chloride. The following formulas demonstrate the synthesis as applied, by way of example, to the preparation of 12-acryloxystearoyl chloride.

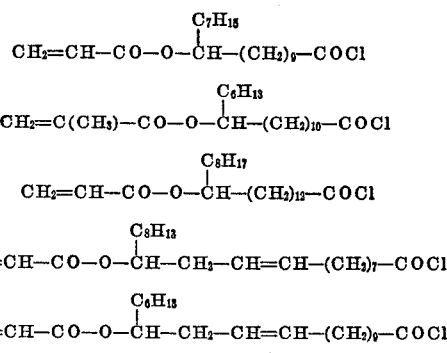

As the starting material for the synthesis one can use various hydroxyaliphatic acids as for example: glycolic, 3-hydroxypropionic, 4-hydroxybutyric, 6-hydroxycaproic, 8-hydroxycaprylic, 10-hydroxycapric, 12 - hydroxylauric, 10-hydroxycapric, 12-hydroxylauric, 14-hydroxymyristic, 16-hydroxypalmitic, 9-, 10-, 11-, 12-, or 18-hydroxystearic, 14-hydroxybehenic, ricinoleic, lesquerolic, and other hydroxyaliphatic acids responding to the formula HO—Alk—COOH wherein Alk is as above defined.

PREPARATION OF POLYMERS

The acryloxyacyl chlorides of the invention may be employed to prepare useful polymers, including both homo- and copolymers. The homopolymers and copolymers are prepared by conventional polymerization techniques used with other acrylates and methacrylates. Typically, the polymerization is carried out in solution. The acryloxyacyl chloride (with or without an additional co-monomer) is dissolved in an inert solvent (such as benzene, toluene, xylene, ethyl acetate, dimethylformamide, etc.), a polymerization initiator is added, and the solution heated at about 50–125° C., preferably under a blanket of nitrogen, helium, or other non-oxidizing gas. The polymerization is preferably catalyzed by the use of an azo initiator such as azodiisobutyronitrile. Peroxide catalysts may also be used, for example, benzoyl peroxide, acetyl peroxide, di-tert-butyl peroxide, etc. The polymerization products range from viscous liquids to semi-solid or even solid materials. They are soluble in solvents such as benzene, toluene, xylene, carbon tetrachloride, etc. A critical attribute of the polymers is that they contain pendant acid chloride (—COCl) groups which provide important advantages as explained below.

In the processing of textiles it is often desirable to modify the properties of the fiber, for example, to improve their shrinkage characteristics. Various procedures have been advocated for such purposes and they usually involve treatment of the textile with a polymer. A common fault of many of these procedures is that the modification has but a temporary effect as the applied substance is removed from the fibers when they are subjected to laundering or dry cleaning.

In accordance with the invention, textile materials are treated with polymers which react with the textile materials so that the modification achieved is deep-seated and durable. In other words, the invention yields the advantage that the polymer applied to the fibers is not just a physical coating but is chemically bonded or grafted to the fibers. The polymers in accordance with the invention contain pendant acid chloride groups and when the polymers are applied to the substrate, these acid chloride groups react with those radicals of the textile substrate which have active hydrogen atoms. Such radicals may also be termed hydrogen-donor radicals and include such types of functions as hydroxyl, primary or secondary amine, primary amide, thiol, carboxyl, etc. Virtually all fibrous materials, both natural and synthetic, contain one or more of such types of hydrogen-donor radicals.

The polymers of the invention include not only homopolymers of the above-described monomers, but also copolymers of the acryloxyacyl chlorides with an additional monomer which does not contain an acid halide group. Generically, the co-monomer may be any compound which is copolymerizable with the acryloxyacyl chloride, which contains at least a single $CH_2=C<$ grouping, and which is free from a hydrogen atom reactive with an acid chloride grouping. In general, copolymers are preferred in the treatment of textile materials because they exert a minimum stiffening effect on the substrate. Examples of monomeric substances which may be copolymerized with acryloxyacyl chlorides to produce copolymers for use in practicing the invention are set forth below by way of illustration but not limitation:

Alkyl esters of acrylic acid and alkyl esters of any of the various α-alkylacrylic or α-haloacrylic acids, e.g., the methyl, ethyl, propyl, isopropyl, butyl amyl, hexyl, octyl, decyl, dodecyl, tetradecyl, hexadecyl, octadecyl, cyclohexyl, oleyl, etc., esters of acrylic, methacrylic, ethacrylic, propacrylic, chloroacrylic, bromoacrylic, etc. acids.

Aryl and aralkyl esters of acrylic acid or the α-substituted acrylic acids, e.g., phenyl, o-, m-, p-tolyl, dodecylphenyl, benzyl, phenylethyl, etc., esters of acrylic, methacrylic, ethacrylic, propacrylic, chloroacrylic, bromoacrylic, etc. acids.

Alkyl acrylates or methacrylates containing an oxygen bridge, typically methoxyethyl acrylate, ethoxyethyl acrylate, propoxyethyl acrylate, butoxyethyl acrylate, octoxyethyl acrylate, cyclohexoxyethyl acrylate, benzoxyethyl acrylate, phenoxyethyl acrylate, methoxyethyl methacrylate, phenoxyethyl methacrylate, etc.

Acrylates containing such radicals as thioether, sulphone, or sulphoxide, for example, the esters of acrylic acid or methacrylic acid with alcohols of this types:

$$R—S—CH_2—CH_2—OH$$
$$R—SO_2—CH_2—CH_2—OH$$
$$R—SO—CH_2—CH_2—OH$$

wherein R is an alkyl radical such as methyl, ethyl, propyl, butyl, etc., or an aryl or aralkyl radical such as phenyl, tolyl, benzyl, phenylethyl, etc.

Vinyl esters of fatty acids, e.g., vinyl acetate, propionate, butyrate, valerate, caprylate, caprate, laurate, myristate, palmitate, stearate, oleate, etc.

Allyl and methallyl esters of fatty acids, e.g., alkyl and methallyl acetates, propionates, butyrates, valerates, caprylates, caprates, laurates, myristates, palmitates, stearates, oleates, etc.

N-dialkyl acrylamides and N-dialkyl α-substituted acrylamides, for example, N-dimthyl, N-diethyl, N-dipropyl, N-dibutyl, N-diamyl, N-dihexyl, N-dioctyl, N-didodecyl, etc., acrylamides, methacrylamides, ethacrylamides, propacrylamides, etc.

Hydrocarbons and halogenated hydrocarbons such as styrene, α-methylstyrene, dimethylstyrenes, vinyl naphthalenes, dichlorostyrenes, vinyl chloride, vinyl bromide, vinylidene chloride, vinylidene bromide.

Ketones such as methyl vinyl ketone, ethyl vinyl ketone, isopropyl vinyl ketone and other alkyl vinyl ketones, methyl isopropenyl ketone, methyl allyl ketone.

Itaconic diesters, for example, the dimethyl, diethyl, diisopropyl, dibutyl, dihexyl, didodecyl and other dialkyl esters of itaconic acids. Diaryl and diaralkyl esters of itaconic acid, e.g., diphenyl itaconate, dibenzyl itaconate, di-(phenylethyl) itaconate, etc.

Other compounds containing the typical $CH_2=C<$ grouping such as cyanostyrenes, vinyl thiophene, vinyl pyridine, vinyl pyrrole, acrylonitrile, methacrylonitrile, alkyl vinyl sulphones such as ethyl vinyl sulphone. Compounds of the types:

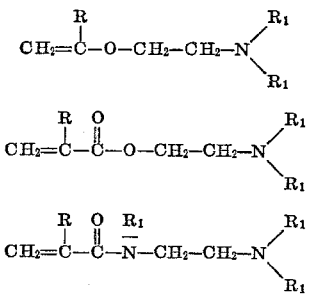

wherein R is H or $CH_3$ and wherein $R_1$ is a lower alkyl group such as $CH_3$, $C_2H_5$, etc.

Although it is generally preferred to copolymerize the acryloxyacyl chloride with an individual monomer such as those exemplified above, it is within the purview of the invention to use mixtures of two or more monomers. Indeed, it is helpful in some instances to use a highly polymerizable compound such as acrylonitrile in conjunction with a monomer of lesser activity such as vinyl acetate, to promote conjoint copolymerization with the acryloxyacyl chloride.

In preparing the copolymers of the invention, the proportions of acryloxyacyl chloride and the other monomer may be varied widely. In general, one uses one mole of acryloxyacyl chloride in conjunction with about 1 to 30 moles of the other monomer.

APPLICATION OF THE POLYMER TO THE TEXTILE

The polymers of the invention may be applied to the textile in various ways. One technique involves applying the polymer as such as to the textile, using heating to make the polymer flow and distributing it with calender rolls or the like. Generally, this technique is not a preferred one because it causes a stiffening of the textile and is thus suitable only in instances where such stiffening effect is desirable or tolerable. A preferred techinque involves dissolving the polymer in an inert, volatile solvent and applying the resulting solution to the textile material. Typical of the solvents which may be used are benzene, toluene, xylene, dioxane, diisopropyl ether, dibutyl ether, butyl acetate, chlorinated hydrocarbons such as chloroform, carbon tetrachloride, ethylene dichloride, trichloroethylene, perchloroethylene, 1,3-dichlorobenzene, fluorohydrocarbons such as benzotrifluoride, 1,3-bis-(trifluoromethyl) benzene, etc., petroleum distillates such as petroleum naphthas, etc. The concentration of the polymer in the solution is not critical and may be varied depending on such circumstances as the solubility of the polymer in the selected solvent, the amount of polymer to be deposited on the fibers, the viscosity of the solution, etc. In general, a practical range of concentration would be from about 1% to about 25%. The solution may be distributed on the textile material by any of the usual methods, for example, by spraying, brushing, padding, dipping, etc. A preferred technique involves immersing the textile in the solution and then passing it through squeeze rolls to remove the excess of liquid. Such techniques as blowing air through the treated textile may be employed to reduce the amount of liquid which exists in interstices between fibrous elements. In any case, the conditions of application are so adjusted that the textile material contains the proportions of polymer desired. Usually, the amount of polymer is about from 0.5 to 20%, based on the weight of the textile material but it is obvious that higher proportions of polymer may be used for special purposes. Preferably, in treating textiles such as fabrics the amount of polymer is limited to a range of about 0.5 to 10% to attain the desired end such as shrink resistance without interference with the hand of the textile.

After application of the polymer the treated textile is cured (heated) to effect reaction between the textile material and the polymer, thus to bond the polymer to the fibers. In cases where the polymer is applied as a dispersion—that is, a solution, emulsion, or suspension—the solvent or other volatile dispersing medium is preferably evaporated prior to the curing operation. Such prior evaporation is not a critical step and the evaporation may be simply effected as part of the curing step. The temperature applied in the curing step is not critical and usually is within the range from about 50° C. to about 150° C. It is obvious that the time required for the curing will vary with such factors as the reactivity of the selected polymer, the type of textile material, and particularly the temperature so that a lower curing temperature will require a longer curing time and vice versa. It will be further obvious to those skilled in the art that in any particular case the temperature of curing should not be so high as to cause degradation of the textile or the polymer. In many cases an adequate cure is effected by heating the treated textile in an oven at about 100° C. for about 5 to 60 minutes.

Although the present invention is of particular advantage in its application to wool, this is by no means the only type of fiber which comes into the ambit of the invention. Generically, the invention is applicable to the treatment of any hydrogen-donor textile material and this material may be in any physical form, e.g. bulk fibers, filaments, yarns, threads, slivers, roving, top, webbing, cord, tapes, woven or knitted fabrics, felts or other non-woven fabrics, garments and garment parts. Illustrative examples of hydrogen-donor textile materials are: polysaccharide-containing textiles, for instance, those formed of or containing cellulose or regenerated celluloses, e.g., cotton, linen, hemp, jute, ramie, sisal, cellulose acetate rayons, cellulose acetate-butyrate rayons, saponified acetate rayons, viscose rayons, cuprammonium rayons, ethyl cellulose, fibers prepared from amylose, algins, or pectins; mixtures of two or more of such polysaccachide-containing textiles; protein-containing textiles, for instance, those formed of or containing wool, silk, animal hair, mohair, leather, fur, regenerated protein fibers such as those prepared from casein, soybeans, peanut protein, zein, gluten, egg albumin, collagen, or keratins, such as feathers, animal hoof or horn; mixtures of any two or more of said protein-containing textiles; mixtures of polysaccharide-containing textiles and protein-containing textiles, e.g., blends of wool and cotton, wool and viscose, etc.; textiles formed of or containing synthetic resins having hydroxy groups in the molecule, e.g., alkyd resins containing hydroxyl groups, polyvinyl alcohol, and partially esterified or partially etherified polyvinyl alcohols; synthetic silk, e.g., nylon, polyurethane, etc.; mixtures of nylon of other synthetic silk with a polysaccarhide or protein fiber; mixtures of synthetic resins containing hydroxyl groups with nylon, polyurethanes, polysaccharide, or protein fibers. By applying the invention to textiles, such as those exemplified herein, desirable results are attained. These include: Increasing the resistance of the textile to shrinking or felting when subjected to washing operations; increasing the resistance of the textile to becoming soiled in use; decreasing the tendency of the textile to becoming creased or wrinkled during wear or during washing and drying operations; etc. Moreover, these desirable effects are attained without impairing such desirable fiber characteristics or tensile strength, abrasion resistance, porosity, and the hand of the material so that the textiles modified in accordance with the invention may be used in fabricating garments or other conventional structures of any kind. The invention may be applied to textiles which contain absorbed or combined water or which have a thin film of water adsorbed on the surface, e.g., glass fibers, asbestos, etc. In such cases the water reacts with the polymer and insolubilizes the latter in situ. It is within the broad compass of the invention, moreover, to apply the polymers to fibrous materials which do not have hydrogen donor groups. In such case the polymer will exist as a coating on the fibrous elements.

EXAMPLES

The invention is further demonstrated by the following illustrative examples.

The various tests referred to in the examples were carried out as follows:

Accelerator shrinkage test: The fabric samples (5" x 6") were milled at 1780 r.p.m. for 2 minutes at 40° C. in an Accelerator with 1% sodium oleate solution, using a liquor-to-fabric ratio of about 50 to 1. After this washing operation, the samples were measured to determine their area and the shrinkage calculated from the original area. The Accelerator is described in the American Dyestuff Reporter 45, p. 685, Sept. 10, 1956. This is a very severe test which applied to untreated wool samples gives an area shrinkage of 40–50%.

Washing machine shrinkage test: The samples were washed in a reversing agitator-type household washing machine, using a 3-lb. load, water temperature of 105° F., and a low-sudsing detergent in a concentration of 0.1% in the wash liquor. The wash cycle itself was for 75 minutes followed by the usual rinses and spin drying. This entire sequence was repeated four times. The damp material is then tumble-dried in a household-type clothes drier. The dried samples were then measured and the shrinkage calculated from the original dimensions. When untreated samples of wool are given a single washing by this procedure, the area shrinkage is about 30–40%.

Example 1.—Preparation of 12-acryloxystearoyl chloride (A) One hundred grams of 12-hydroxystearic acid and 1.0 gram of copper resinate were mixed at room temperature in a Pyrex glass reactor fitted with a stirrer, thermometer, reflux condenser and drying tube, nitrogen inlet, dropping funnel, and heating bath. After sweeping out the system with nitrogen gas, 102 grams of acryloxyl chloride was added dropwise during 10 minutes, and then refluxed at 65° C. for 4 hours. The excess acryloyl chloride was removed by distillation at reduced pressure to yield 149 grams crude, gummy 12-acryloxystearic acid.

(B) The 149 grams of 12-acryloxystearic acid was dissolved in 250 ml. of benzene in the same apparatus as above and blanketing the system with nitrogen gas as before. One hundred and forty-eight grams oxalyl chloride was added at room temperature during 30 minutes, and the solution then was heated at 45° C. for approximately 1 hour and then stirred at room temperature overnight. The excess solvent and oxalyl chloride were removed by distillation at reduced pressure to yield 117 grams crude, gummy 12-acryloxystearoyl chloride. Distillation of the crude acid chloride using an ASCO wiped film molecular still at 20μ and 170° C. yielded 45 grams of clear yellow distillate. This was redistilled to yield 42 grams of the desired product as a clear liquid.

*Elemental analysis.*—Theor. for $C_{21}H_{37}O_3Cl$ (percent): C, 67.7; H, 10.0; O, 12.8; Cl, 9.5. Found (percent): C, 65.9; H, 9.82; Cl, 11.9.

Example 2.—Preparation of 10-acryloxydecanoyl chloride

The procedure described in Example 1 was applied to the following materials:

In Step A, 10 grams of 10-hydroxydecanoic acid, 14.2 g. of acryloyl chloride, and 100 mg. of copper resinate were used. The crude intermediate, 10-acryloxydecanoic acid, obtained in a yield of 17 g. was applied to Step B with 50 ml. of benzene and 10 g. of oxalyl chloride. Redistillation of the crude product yielded 8.5 g. of 10-acryloxydecanoyl chloride as a clear liquid.

Example 3.—Preparation of 12-acryloxyoleoyl chloride

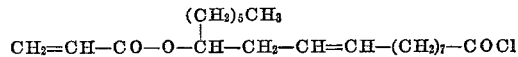

The procedure described in Example 1 was applied to the following materials:

In Step A, 189 grams of ricinoleic acid and 115 grams of acryloyl chloride were used. The crude intermediate, 12-acryloxyoleic acid, obtained in a yield of 207 g. was applied to Step B with 280 ml. of benzene and 159 g. of oxalyl chloride. Redistillation of the crude product yielded 72 g. of 12-acryloxyoleoyl chloride.

Example 4.—Copolymer of 12-acryloxystearic acid and n-butyl acrylate

A solution containing 100.0 g. n-butyl acrylate, 20.0 g. 12-acryloxystearoyl chloride and 1.0 g. azobisisobutyronitrile in 500 ml. toluene was heated under nitrogen atmosphere at reflux (112° C.) for 2 hours. After cooling, the resulting viscous copolymer solution was diluted with toluene or perchloroethylene to provide 10 g. of copolymer per 100 ml. of solution. This solution was then used to treat fabrics as described below.

Example 5.—Homopolymer of 12-acryloxystearyl chloride

A solution of 3 g. of 12-acryloxystearoyl chloride and 100 mg. of azobisbutyonitrile in 15 ml. of benzene was refluxed for 2 hours under a blanket of nitrogen gas, yielding a viscous solution of the homopolymer in benzene.

Example 6.—Copolymer of methyl acrylate and 10-acryloxydecanoyl chloride

A solution containing 10 g. of methyl acrylate, 2 g. of 10-acryloxydecanoyl chloride, and 0.1 g. of azobisbutyronitrile in 50 ml. of toluene was heated under nitrogen atmosphere at reflux (112° C.) for 2 hours. After cooling, the resulting viscous solution was diluted with toluene or perchloroethylene to provide 10 g. of copolymer per 100 ml. of solution. This solution was then used to treat fabrics as described below.

Example 7.—Preparation of various polymers

A series of polymers were prepared using the procedure described in Example 4 and varying the monomers and the ratio thereof, as tabulated below. A homopolymer of n-butyl acrylate was also prepared for comparative purposes.

| Polymer code number | Monomer 1 | Monomer 2 | Ratio of Monomer 1 to Monomer 2 Weight basis | Molar basis |
|---|---|---|---|---|
| I | n-Butyl acrylate | 12-acryloxystearoyl chloride | 5/1 | 14.5/1 |
| II | do | do | 10/1 | 29/1 |
| III | do | 10-acryloxydecanoyl chloride | 5/1 | 10/1 |
| IV | do | 12-acryloxyoleoyl chloride | 5/1 | 14.5/1 |
| V | Methyl acrylate | 10-acryloxydecanoyl chloride | 5/1 | 15/1 |
| VI | Methyl methacrylate | do | 5/1 | 13/1 |
| H | n-Butyl acrylate | None | Homopolymer | |

Example 8.—Treatment of fabrics

Samples of wool fabric (6.4 oz./yd.$^2$, undyed plain weave, 32 ends and 28 picks per inch) were treated with solutions of the polymers diluted (with benzene or perchloroethylene) to 10% polymer concentration, using the following technique. A weighed fabric sample is immersed in the polymer solution, then removed and pressed between pad rolls to remove excess liquid, dried in air, and then cured in an oven at 150° C. for 10 minutes. The sample is then weighed to determine the polymer uptake, and the sample is tested for shrinkage by the accelerator test method and/or by the washing machine test. Samples of the untreated fabric were also subjected to these tests. The results are tabulated below:

| Polymer applied | Uptake of polymer on fabric | Area shrinkage, percent Accelerator test | Washing machine test [1] |
|---|---|---|---|
| I | 8.3 | 6.9 | 0.3 |
| II | 8.7 | 20.0 | 2.5 |
| III | 11.2 | 2.0 | |
| IV | 7.4 | 5.1 | 9.0 |
| V | 8.5 | 12.4 | |
| VI | 8.1 | 20.1 | |
| H [2] | 9.8 | 30.6 | |
| None (blank) | | 45.4 | 56.1 |

[1] Four 75-minute washes.
[2] Homopolymer of butyl acrylate.

The fabric treated with polymer I (the 5/1 copolymer of n-butyl acrylate and 12-acryloxystearoyl chloride) and the untreated fabric were subjected to other tests. The results are given below:

| Test | Direction | Treated fabric | Untreated fabric |
|---|---|---|---|
| Break strength [1] dry, lbs | Warp | 15.0 | 18.6 |
|  | Fill | 16.6 | 14.2 |
| Break strength [1] wet, lbs | Warp | 10.0 | 13.5 |
|  | Fill | 11.3 | 11.3 |
| Monsanto wrinkle recovery,° | Warp | 156 | 156 |
|  | Fill | 158 | 152 |
| Flexural rigidity (cantilever test), mg.-cm. | Warp | 110 | 151 |
|  | Fill | 139 | 98 |
| Air permeability, ft.$^3$/ft.$^2$/min | | 152 | 167 |

[1] ASTM test method D-39-49, 1″ wide strip.

Having thus described the invention, what is claimed is:
1. An acryloxyacyl chloride of the structure

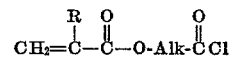

wherein R is H or $CH_3$, and Alk is a bivalent aliphatic hydrocarbon group containing 1 to 21 carbon atoms.

2. The compound of claim 1 wherein Alk is
$$-(CH_2)_9-.$$

3. The compound of claim 1 wherein Alk is $$-\overset{\underset{\mid}{(CH_2)_5CH_3}}{CH}-(CH_2)_{10}-.$$

4. The compound of claim 1 wherein Alk is $$-\overset{\underset{\mid}{(CH_2)_5CH_3}}{CH}-CH_2-CH=CH-(CH_2)_7-.$$

References Cited
UNITED STATES PATENTS
U. Eisner, et al.: J. Chem. Society (London), pp. 1501–1512 (1951).

LORRAINE A. WEINBERGER, Primary Examiner

P. J. KILLOS, Assistant Examiner

U.S. Cl. X.R.

260—486 H